United States Patent [19]
Braun et al.

[11] 3,886,554
[45] May 27, 1975

[54] METHOD AND APPARATUS FOR IMPROVING THE ACCURACY OF A VEHICLE LOCATION SYSTEM
[75] Inventors: William V. Braun, Lauderhill, Fla.; Edward F. Handy, Schaumburg, Ill.
[73] Assignee: Motorola, Inc., Chicago, Ill.
[22] Filed: Apr. 23, 1973
[21] Appl. No.: 353,286

[52] U.S. Cl. ............... 343/112 R; 343/114; 343/115
[51] Int. Cl. .............................................. G01s 3/02
[58] Field of Search.......... 343/112 R, 112 TC, 103, 343/102, 114, 115

[56] References Cited
UNITED STATES PATENTS
2,945,224  7/1960  Myers ................................ 343/102
3,680,121  7/1972  Anderson et al. ............ 343/112 TC Primary Examiner—T. H. Tubbesing
Assistant Examiner—S. C. Buczinski
Attorney, Agent, or Firm—Eugene A. Parsons; James W. Gillman

[57] ABSTRACT

Method and apparatus for improving the accuracy of a vehicle location system, particularly of a phase ranging type, by reducing the effects of multipath propagation through the use of a variable pattern antenna for the vehicle transmitter. Separate range measurements are made using each antenna pattern, and the measurements are averaged to provide a more accurate reading.

16 Claims, 6 Drawing Figures

Patented May 27, 1975  3,886,554

METHOD AND APPARATUS FOR IMPROVING THE ACCURACY OF A VEHICLE LOCATION SYSTEM

BACKGROUND

1. Field of Invention

This invention relates to vehicle location systems, and more particularly to vehicle location systems of the phase ranging type wherein a signal is received from the vehicle to be located by at least two receiving sites, and the phase of the signal received at each site is compared with the phase of the signal received at the other site to determine the location of the vehicle.

2. PRIOR ART

Several phase ranging vehicle location systems are known. Such systems generally employ a transmitter at the vehicle feeding an onmi-directional antenna for transmitting signals to the receiving sites.

Whereas these systems provide a way to achieve an indication of the location of the vehicle, in systems of the prior art, the indication is often substantially in error due to multipath reflections from buildings, aircraft, other vehicles, and the like, which tend to cause an apparent increase or decrease in the distance betwen the vehicle and the receiving site. Prior Art attempts to correct the aforementioned problem include the use of multiple antennas at the receiving site for averaging the signals from the vehicle, however, the improvement obtainable is proportional to the separation between the receiving antennas, which is limited in practical systems, thereby limiting the improvement in accuracy that can be achieved.

SUMMARY

It is an object of the present invention to provide a vehicle location system having greater accuracy than vehicle location systems of the prior art.

It is a further object of this invention to provide an antenna for the vehicle in a vehicle location system which substantially improves the accuracy of that system.

In accordance with a preferred embodiment of the invention, a variable pattern antenna is used in conjunction with the vehicle location transmitter in the vehicle. A transmission from the vehicle is made utilizing each antenna pattern, and a range measurement is made with each pattern. An average is taken of the individual range measurements to provide a range measurement that is substantially more accurate than measurements obtainable utilizing prior art systems. Any number of antenna patterns may be utilized, depending on the desired accuracy, and the averaging may be done automatically within a time frame of several milliseconds.

DETAILED DESCRIPTION

Figure 1:
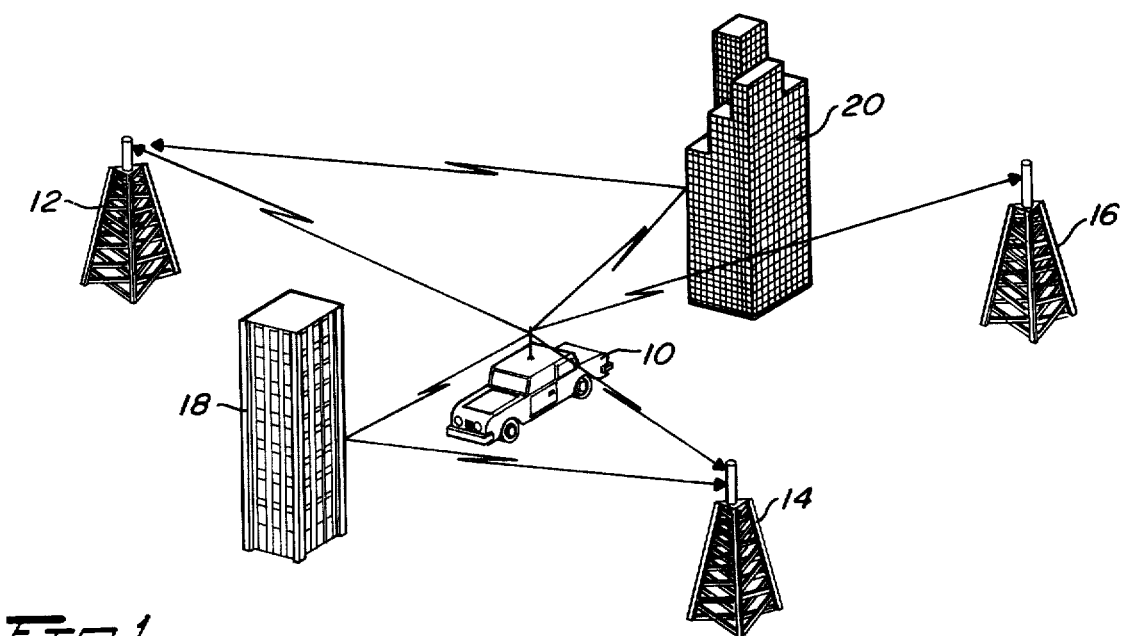
FIG. 1 is a drawing of a vehicle location system showing a vehicle, the vehicle location receiver sites and objects causing multipath reflection.

Referring to FIG. 1, a vehicle 10 has a transmitter therein for transmitting signals to a plurality of receiving sites, in this embodiment, receiving towers 12, 14 and 16. The signals transmitted by the vehicle 10 may be of various types, including pulsed carrier signals or carrier waves having AM or FM modulation thereon. For purposes of illustration, it shall be assumed that the signals from vehicle 10 are carrier wave signals having predetermined frequency tones, such as, for example, 3 kHz, modulated thereon. The signal from the vehicle 10 is received at each of the sites 12, 14 and 16, and the modulation thereon is detected. The demodulated tone from each of the receiving sites 12, 14 and 16 is applied to a phase comparing means (not shown) wherein the phase of the three detected signals is compared and the position of the vehicle 10 is calculated from the phase difference. Only two sites, such as, for example, receiver sites 12 and 14, are necessary to locate the vehicle, but additional sites, such as site 16, may be provided to provide a greater degree of accuracy than can be achieved utilizing only two sites.

In a typical system, used in an urban environment, radio signal reflecting objects, such as buildings 18 and 20, are present to reflect the signals from the vehicle 10 to the receiving towers. For example, the receiving site 12 receives a signal directly from the vehicle 10 and a second reflected signal from the building 20. Similarly, the receiving site 14 receives a signal from the vehicle 10 and a reflected signal from the building 18. Since the propagation length between the vehicle and the receiving sites is longer for reflected signals than for direct signals, the resultant signal received by the receiving site has an apparent phase delay different from the phase delay of the direct signal, thereby causing inaccuracies in the calculated position of the vehicle 10.

The inventor has noted through intensive experimentation that the accuracy of a vehicle location system of the type shown in FIG. 1 could be significantly improved by using a highly directional antenna having narrow radiation beams at the vehicle 10, and pointing the beams directly at the receiving sites. The directional antenna improved accuracy by minimizing the error caused by reflected signals. Since it would be impractical to utilize a highly directional antenna which must at all times be pointed at the receiving sites in an actual system, a variable pattern antenna system which averages out the multipath errors was developed.

Figure 2:
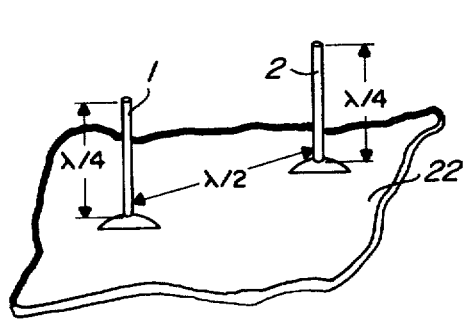
FIG. 2 is a partial perspective drawing showing a portion of the roof of the vehicle and one embodiment of the antenna according to the invention mounted thereon.

Referring to FIG. 2 there is shown one embodiment of the multi-pattern antenna for minimizing vehicle location error according to the invention. In FIG. 2, a pair of radiating elements, in this embodiment a pair of quarter wavelength whip antennas 1 and 2, are mounted on the roof 22 of the vehicle. The spacing between the antennas 1 and 2 is, in this embodiment, one-half wavelength. By selectively energizing one or both of the antennas with radio signals having various phase relationships, a variety of patterns may be produced.

Figure 5:
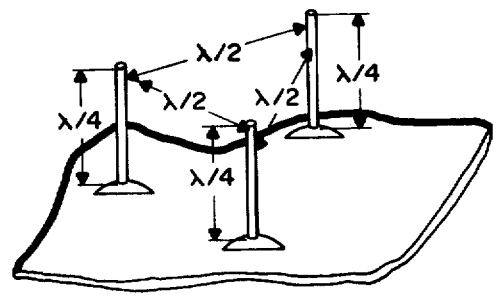
FIG. 5 is a partial perspective drawing of another embodiment of the antenna according to the invention.
Figure 3:
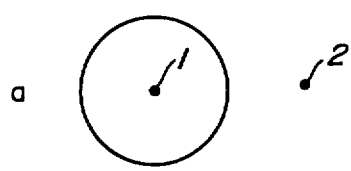
FIG. 3 shows four of the patterns obtainable with the antenna of FIG. 2.
Figure 3:
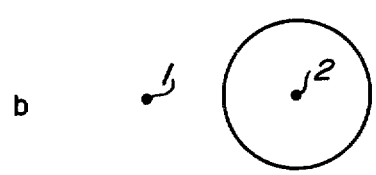
Figure 3:
Figure 3:
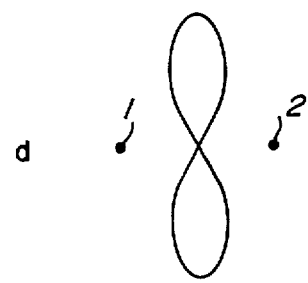

FIG. 3 shows the pattern produced by the antenna system of FIG. 2. Graph A of FIG. 3 shows the onmidirectional pattern that is obtained when only the antenna 1 is energized by the transmitter of vehicle 10. Similarly, the graph B shows the pattern obtained when only the antenna 2 is energized. Energizing both of the antennas 1 and 2 with signals that are 180° out of phase produces the horizontal figure eight pattern shown in graph C, while energizing both antennas with in-phase signals provides the figure eight pattern of graph D. The radiation patterns shown in FIG. 3 are simple patterns shown for purposes of illustration, and other more complex patterns particularly suitable for vehicle location purposes may be provided by utilizing other phase shifts, and applying the signals to the radiating elements in other than equal proportions. Additional patterns may be obtained by utilizing additional radiating elements, such as, for example, three radiating elements arranged in a equilateral triangle and spaced one-half wavelength apart, as shown in FIG. 5. In the embodiment of FIG. 5, the antennas may be sequentially energized in pairs, each pair providing the patterns of FIG. 3. With this arrangement, a total of 12 patterns may be obtained, each pair of antennas providing the four patterns of FIG. 3 rotated 120° from each other.

Figure 4:
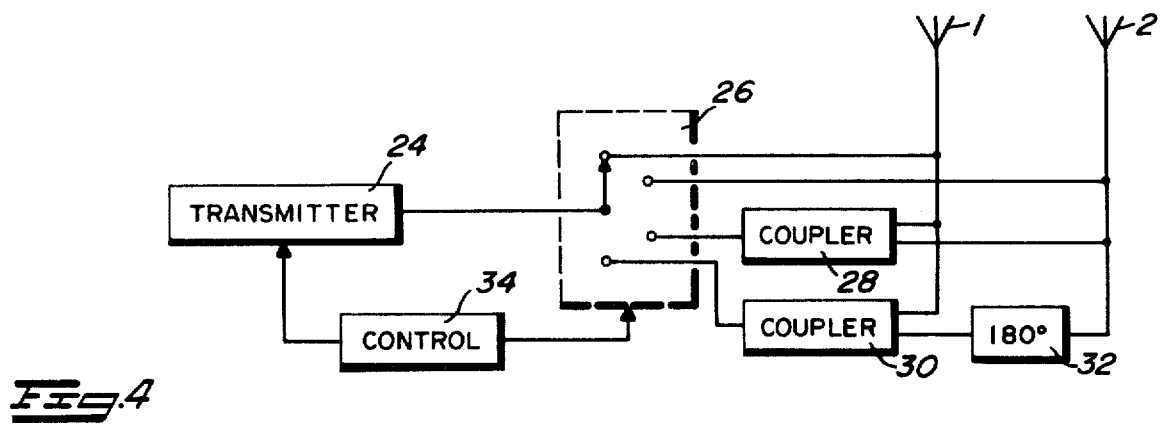
FIG. 4 is a block diagram of the vehicle location transmitter and shows means for coupling the antenna of FIG. 2 to the transmitter to obtain the patterns shown in FIG. 3.

FIG. 4 shows one embodiment of apparatus for energizing the antennas 1 and 2 of FIG. 2 to provide the radiation patterns of FIG. 3. A transmitter 24, located in the vehicle 10 of FIG. 1, is coupled to the antennas 1 and 2 by means of a switching circuit 26, a pair of couplers 28 and 30, and a phase inverting network 32. A control circuit 34, connected to the transmitter 24 and the switching circuit 26, is used to key the transmitter for a predetermined time duration each time a reading of the position of the vehicle 10 is desired. Simultaneously, the control circuit 34 sequentially switches the switching circuit 26 through each of its four positions during the time interval that the transmitter 24 is keyed. The switching circuit 26 is shown in FIG. 4 as a rotary switch for purposes of clarity, but any electronic or mechanical switching circuit capable of providing the desired switching function may be used and still fall within the scope of the invention. The couplers 28 and 30 may be standard 3db couplers, well known in the art, and the phase shifting network 32 may be any active or passive phase shifting network, such as a transmission line or a transformer.

In operation, each time an indication of the location of the vehicle 10 is desired, a control signal is applied by the control circuit 34 to transmitter 24 to key the transmitter to cause it to provide radio frequency signals to the switching circuit 26. The control circuit 34 may key the transmitter 24 upon a manual command from the operator of the vehicle, or more commonly, automatically upon a radio command from one of the receiving sites 12, 14 and 16. When the transmitter is initially keyed, the armature of the switching circuit 26 is connected to the uppermost contact, as shown, to energize the antenna 1 to give the pattern shown in graph A of FIG. 3. The antenna 1 is energized for a predetermined time duration while the signal transmitted thereby is received at the three receiving sites 12, 14 and 16, and a first calculation of the position of the vehicle 10 is made. Subsequently, the armature is automatically moved to the next position to cause the antenna 2 to be energized to provide the pattern shown in graph B, and a second calculation of the position of the vehicle is made. Similarly, in the third and fourth positions of the switching circuit 26, the antennas 1 and 2 are energized in phase and 180° out of phase, respectively, to provide the patterns shown in graphs D and C, and two more calculations of the position of the vehicle are made. After the switch 26 has been sequenced through all four of its positions, the transmitter 24 is de-energized by the control circuit until the next position reading is desired. At the same time, an average value of the four position readings is calculated, and the average value is displayed to provide an indication of the position of the vehicle.

The circuit shown in FIG. 4 is provided primarily for purposes of illustration, and in a practical system, a greater number of antenna patterns would be provided to provide a greater degree of accuracy. For example, in a practical system three radiating elements, as shown in FIG. 5, and ten patterns obtained by variable amplitude and phase energization of the three elements would be provided. Each of the 10 patterns would be utilized for 3 milliseconds to provide a 30 millisecond total sampling period during which time the transmitter would be keyed, and 10 individual position readings, one for each pattern, would be calculated.

Figure 6:
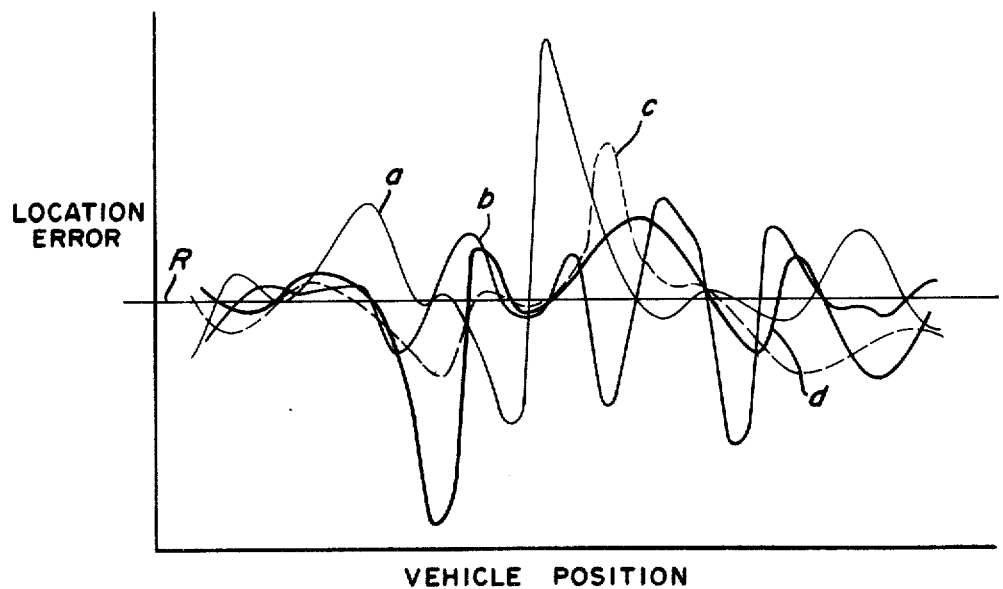
FIG. 6 is a graph of the location error resulting from each antenna pattern of FIG. 3 as a function of vehicle position.

FIG. 6 is a graph showing the errors resulting from multipath propagation that have been experimentally found to exist for each of the antenna patterns of FIG. 3. The horizontal line R represents the true, or real, distance between the vehicle and an arbitrary reference point, whereas the oscillating lines $a$, $b$, $c$ and $d$ represent the measured distance between the reference point and the vehicle for each of the radiation patterns A, B, C and D respectively. Note that as the vehicle moves, movement of the vehicle being represented by the horizontal coordinate, or abscissa of the graph of FIG. 6, the calculated distance provided by each of the radiation patterns fluctuates above and below the horizontal line R. Hence, it can be seen, that each pattern taken by itself can provide substantial positive or negative errors in the calculation of the distance of the vehicle from a predetermined reference point. However, there is very little correlation between the errors caused by each of the antenna patterns, one pattern tending to show a positive error, while another pattern shows a negative error. Hence, it can be seen that when the readings provided by the four antenna patterns are averaged, the resultant value remains fairly close to the line R, which represents the actual distance. It has been found experimentally, that the greater the number of patterns employed, the more closely the average of the patterns approaches the line R, and that 10 patterns provide a good compromise between accuracy and system complexity.

Although particular embodiments of antennas have been shown for purposes of illustration, any system employing the principles discussed in this application to improve the accuracy of a vehicle location system falls within the scope and spirit of the invention.

We claim:

1. The method of locating the position of a vehicle comprising the steps of:

radiating a radio signal from the vehicle in a predetermined radiation pattern;

switching the directivity of said radiation pattern to a predetermined sequence of radiation patterns;

receiving said radio signal in said sequence of radiation patterns at two geographically spaced receiving sites;

comparing the signals received at said two sites to determine the location of said vehicle.

2. The method recited in claim 1 wherein the step of receiving said radio signal includes the steps of; receiving a first signal radiated in a first radiation pattern at each of said receiving sites, and receiving a second signal radiated in a second radiation pattern at each of said receiving sites.

3. The method recited in claim 2 wherein said step of comparing said signals includes the steps of; comparing said fiirst signals received at said sites to provide a first location reading, comparing said second signals received at said sites to provide a second location reading, and determining said location in response to said first and second location readings.

4. The method recited in claim 3 wherein the step of radiating the radio signal includes the step of modulating said radio signal with a predetermined frequency tone, the step of receiving said radio signals includes the step of detecting said tone at each of said receiving sites, and the step of comparing said received signals includes the step of comparing the phases of the tones detected at each site to determine said location readings.

5. The method recited in claim 4 wherein said location is determined by the step of automatically determining the average of said location readings, and displaying a location indicative of said average.

6. In a vehicle location system for locating a vehicle employing a mobile transmitter for transmitting radio signals, and a plurality of receiving sites for receiving and comparing the signals received thereby from the mobile transmitter, an antenna system comprising;

a plurality of radiating elements mounted on said vehicle; and means for selectively applying radio signals to said elements in a predetermined sequence connected to said transmitter and to said elements.

7. An antenna system as recited in claim 6 further including control means connected to said transmitter and to said selective application means for rendering said transmitter operative to provide radio signals for a predetermined time interval, said selective application means being responsive to said control means for applying said radio signals to said elements in said predetermined sequence during said predetermined time interval.

8. An antenna system as recited in claim 7 further including phase shifting means coupled to said selective application means for varying the phase of the radio signals applied to said radiating elements.

9. A system for locating the position of a vehicle within a predetermined geographic area including in combination:

radio transmitting means carried by the vehicle for providing radio signals;

variable radiation pattern antenna means connected to said radio transmitting means for receiving said radio signals from said transmitting means and radiating said signals from the vehicle in a sequentially switched plurality of different directivity radiation patterns;

a plurality of receiving means for receiving the radio signals from said radio transmitting means;

means coupled to said receiving means for comparing the radio signals, received in the plurality of different radiation patterns by each of said receiving means, to provide an indication of the location of said vehicle.

10. A vehicle location system as recited in claim 9 including control means coupled to said transmitting means and to said variable radiation pattern antenna means for rendering said transmitting means operative and for sequentially varying the radiation pattern to cause said radio signals to be radiated in said plurality of different directivity radiation patterns.

11. A vehicle location system as recited in claim 10 wherein said comparing means includes means for providing a plurality of location readings in response to said radio signals, each location reading corresponding to a different radiation pattern and means for combining said location readings to provide said indication of vehicle location.

12. A vehicle location system as recited in claim 11 wherein said variable radiation pattern antenna means includes a plurality of radiating elements, and said control means includes means coupled to said elements for selectively applying said radio signals to said elements in a predetermined sequence to vary said radiation pattern.

13. A vehicle location system as recited in claim 12 wherein said control means further includes phase shift means for varying the phase of the radio signals applied to said elements.

14. A vehicle location system as recited in claim 13 wherein said transmitting means includes means for modulating said radio signal with a predetermined frequency tone, and each of said receiving means includes means for demodulating said radio signal to detect the predetermined frequency tone.

15. A vehicle location system as recited in claim 14 wherein said comparing means includes means connected to each of said demodulating means for comparing the phases of said detected tones to provide one of said location readings in response to each comparison.

16. A vehicle location system as recited in claim 15 wherein said combining means includes means for deriving the average of said location readings.

* * * * *